Aug. 27, 1946.  T. G. MYERS.  2,406,505
BEARING SUPPORT
Original Filed April 11, 1939
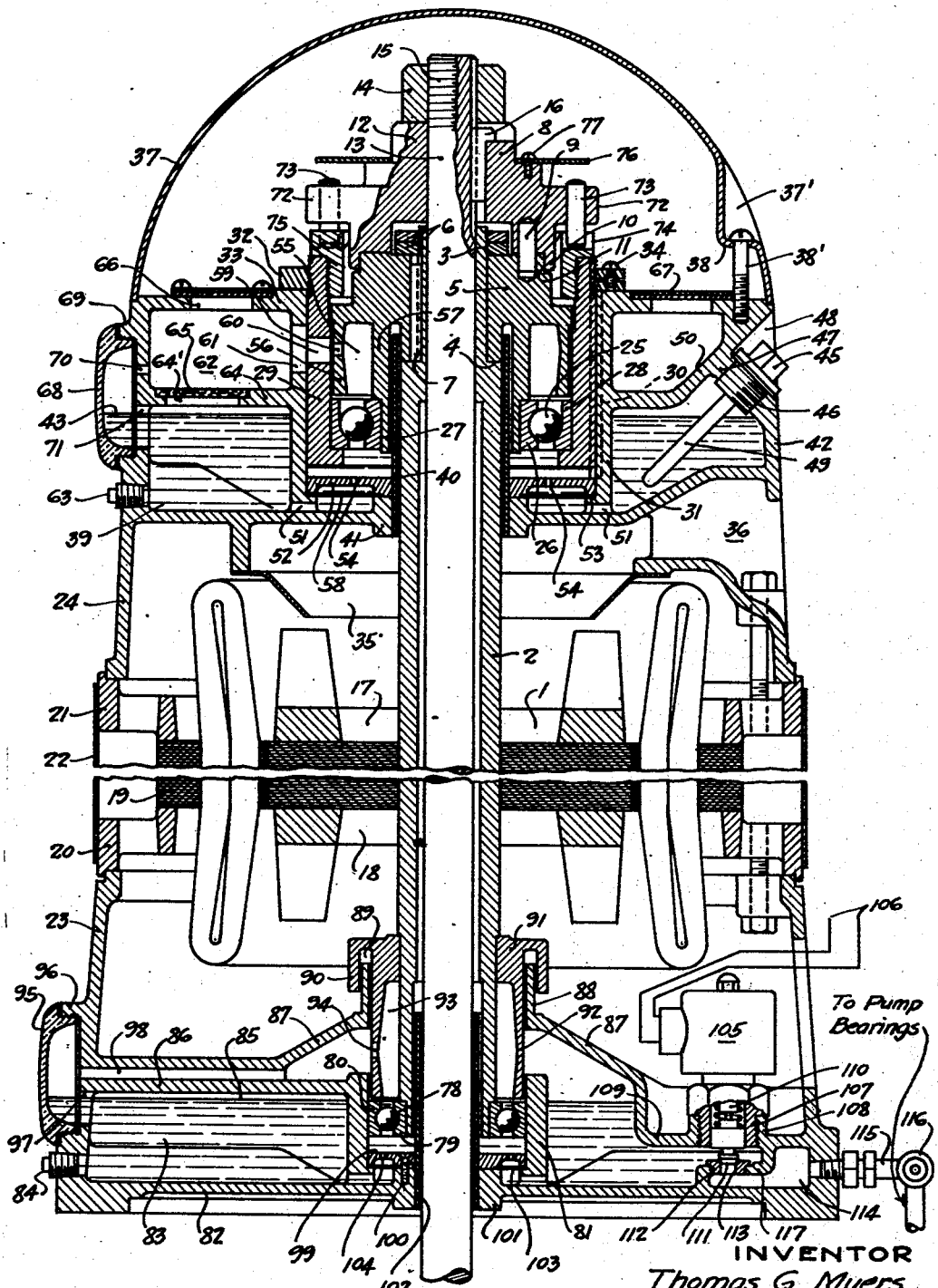
INVENTOR
Thomas G. Myers
BY John Flam
ATTORNEY Patented Aug. 27, 1946

2,406,505

UNITED STATES PATENT OFFICE 2,406,505

BEARING SUPPORT

Thomas G. Myers, Los Angeles, Calif., assignor to U. S. Electrical Motors, Inc., Los Angeles, Calif., a corporation of California Original application April 11, 1939, Serial No. 267,239. Divided and this application March 29, 1943, Serial No. 480,959

10 Claims. (Cl. 308—187)

This invention relates to bearing supports for vertical shafts and lubrication thereof, such, for example, as vertical motor shafts adapted to be directly coupled to a vertical pump shaft.

This application is a division of an application entitled "Metered oil control," filed in the name of Thomas G. Myers on April 11, 1939, Serial No. 267,239.

The bearings for such shafts are usually of the ball bearing type, the balls of which are placed in an oil well, or a little above it. The rotation of the shaft with its attached parts causes a turbulence in the oil such that the oil is passed upwardly through the spaces between the rolling elements. Often provisions are made to produce a lifting effect on the oil to cause it to pass through the bearings, as by a rotating element attached to the shaft.

It is an object of this invention to make it possible to observe the circulation of the oil during operation of the motor.

It is still another object of the invention to provide a drive connection between the motor shaft and the pump shaft, such that the desired relative axial adjustment of the pump runners with respect to the rotor may be accomplished.

It is a still further object of this invention to provide supporting means for the pump shaft which will permit axial adjustment of the pump shaft to be readily accomplished while the pump is in operation, for ensuring that the pump runners will be in the optimum axial position with relation to the other parts of the pump structure.

This invention possesses many other advantages, and has other objects which may be made more easily apparent from a consideration of an embodiment of the invention shown in the drawing accompanying and forming part of the present specification. This form, which illustrates the general principles of the invention, will now be described in detail; but it is to be understood that this detailed description is not to be taken in a limiting sense, since the scope of the invention is best defined by the appended claims.

Referring to the drawing:

The single figure is a longitudinal sectional view of an electric motor structure embodying the invention, a part of the axial length of the motor being broken away to reduce the size of the figure.

In the form of the invention illustrated, a vertical motor arrangement is disclosed. The rotor structure 1 of the motor is shown as carried by a hollow motor shaft 2. This hollow shaft is shown as provided with a threaded extremity 3 for attaching a coupling member 5, as by the aid of the shoulder 4 on the shaft 2, and the nuts 6 engaging the threaded extremity, coupling member 5 being secured against rotation on shaft 3 by a key 7.

The coupling member 5 is shown as coupled to a corresponding upper coupling member 8, as by the aid of one or more dowel pins 9. This coupling member 8 has a flange 10 telescoping over a cylindrical surface 11 formed on the coupling member 5, and also has a hub portion 12 securely fastened to the inner shaft 13 which carries the pump runners below the vertical motor structure. The coupling member 8 may be held in place as, for example, by a nut 14 threaded on the end 15 of the shaft 13, a key 16 is being provided to prevent the coupling member 8 rotating with respect to the shaft, but permitting relative axial adjustment between them.

The rotor 1 is indicated as of the squirel cage type, having flanges 17 and 18 for clamping the rotor laminations. It co-operates with a stator structure 19 held in a motor frame, which may include the lower portion 20 and upper portion 21 connected as by sheet metal cylindrical portion 22. Portions 20 and 21 serve, as by bolts or rivets, to clamp the stator laminations together. The frame structure 20—21—22 may be appropriately supported on a base member or support 23, adapted to be mounted on top of the pump structure. The upper portion 21 of the frame carries an end bell or bracket 24, which is shown as provided with an inwardly directed deflecting member 35 and with one or more apertures 36 for air circulation.

In the present instance the rotary parts of the pump, such as pump runners, etc., are arranged to be supported by the aid of the upper bearing structure of the electric motor. Thus, this bearing structure is of the ball thrust bearing type, including a series of balls 25. The inner race 26 is shown as carried by a reduced extension 27 of the coupling member 5. The outer race 28 is supported in a cylindrical support 29, shown as splined at 30 in the interior of a cup-like guide 31 formed integrally with the end bell or bracket 24.

The vertical adjustment of the position of the thrust bearing structure makes it possible accurately to adjust the position of the pump runners supported on shaft 13 below the motor. This can be accomplished while the motor is in operation by the aid of the structure now to be described.

Thus, the upper end of the cylindrical race support 29 is exteriorly threaded. This thread is engaged by a nut 32, the lower side of which is in contact with the upper flange 33 of the end bell 24, whereby flange 33 supports the cylindrical race support 29 by the aid of nut 32. By rotating the nut 32, the cylindrical support 29 may be lowered or raised, since this support is restricted from rotation by the aid of the spline 30. After adjustment, the nut 32 may be locked, as by a screw 34 engaging split portions of the nut 32, for urging these split portions together and thereby clamping the nut against the threads on the cylindrical support 29.

The upper end of the shaft structure is arranged to be covered by a sheet metal dome-shaped cover 37. This sheet metal cover has a lower edge resting upon the top of flange 33. It may be provided with several recesses 37₁ having horizontal walls 38 for accommodation of fastening screws 38₁, passing through the walls 38 and engaging the top flange 33.

Provisions are made for providing a lubricant, such as oil, for the thrust bearing structure. For this purpose a lubricant well 39 is provided in the bell 24. Thus, a sleeve 40, surrounding shaft 2 and extending upwardly past the bearing structure, is fastened within the hub 41 of flange 33 of the end bell 24. This sleeve 40 co-operates with the exterior wall 42 of bell 24 to form the well 39. This well is adapted to carry lubricant to about the level 43, so that the bearing structure 25—26—28 is submerged when the motor is not operating. In this way, the bearing will not be exposed to corrosion, even over long periods of inactivity of the motor.

Lubricant may be supplied to well 39 through an opening, shown as closed by the plug 45 at the right hand portion of the figure. This plug is accommodated in a threaded aperture 46 in a sloping wall 47 of a recess 48 in the outer wall 42, and carries an extension 49 extending substantially below the normal level 43 of the lubricant. The extension 49 functions as a "dip stick"; for, when the plug and extension are removed from the lubricant well, the depth of lubricant in the well may be ascertained from an examination of the stick. By providing this recess, external projections such as plugs are avoided. The slanting wall 47 joins the outer wall 42 and a sloping wall 50 extending above the lubricant well 39 at the place where plug 45 is located.

In order to permit oil to pass inwardly of the guide 31 to the bearing structure, one or more apertures 51 may be provided at the bottom of the guide. An oil metering device 52 is supported appropriately upon an inner shoulder 53 of the guide 31 and beneath the cylindrical support 29. It may extend radially inwardly to contact with the sleeve 40, and may be provided with one or more restricted apertures 54 serving as an oil metering device.

The oil is arranged to pass through the metering apertures 54 into the space between the inner and outer races 26 and 28. Thence the oil is thrown upwardly by rotation of the bearing elements 25—26 into a chamber 55 formed between the depending flange 56 of the coupling member 5 and the hub 57 thereof. Also, if desired, a screen member 58 may be disposed beneath the metering device 52.

The oil progresses past the balls 25 into the chamber 55; thence radially outwardly through one or more radial apertures 59 in flange 56 and radial apertures 60 in the cylindrical support 29; through apertures 61 in the guide member 31 to a space 62 above the lubricant well 39. By appropriate choice of sizes of the apertures 59, 60, and 61, the vertical adjustment of the shaft structure does not interfere with the passage of the lubricant back to the well 39. The lubricant may be withdrawn at will from the well through an aperture closed by a plug 63. In this connection it is to be noted that the amount of lubricant in the well is large as compared to the quantity passed through the bearing when the motor is operating. Thus the lever 43 of the lubricant is substantially the same with the motor operating or not.

The space 62 extends above the top wall 64 of the well. This top wall extends over the entire well and is joined to the sloping wall 50. This top wall 63 has several apertures or openings 64' extending through it, across which are disposed filter pads 65, of felt or the like. The oil as it enters the space 62 will pass through the filter pads 65 into well 39; thus, foreign matter is strained from the lubricant. The top wall 33 of the end bell 24 may also be provided with a number of openings 66 for inspection purposes, and to permit cleaning and replacement of pads 65. These openings 66 may be closed by cover members 67.

In order to make it possible to view the circulation of the oil while the apparatus is in operation, as well as to note the level of the oil in the well, whether the apparatus is operating or not, a transparent cover 68 is provided. This cover may be made of some plastic molded material, such as Catalan, and is shown as threaded into an interiorly threaded boss 69 projecting from the wall 42. Opposite the cover member 68 there is a supplemental aperture or by-pass 70 in wall 42, leading from the space 62, as well as an aperture 71 leading into the lubricant well 39.

As clearly shown in the drawing, the body of lubricant extends through aperture 71 into the transparent cover 68, so that the level of the surface 43 of the lubricant may be readily observed, and the quantity of lubricant in well 39 may be estimated without the necessity of using the dip stick 45—49. When the motor is running, the rapid rotation of the parts 25—26 of the bearing structure will create turbulence of that oil within the guide 29 and above the plate 52, causing this oil to rise in space 55. Thence it is thrown out through openings 59, 60, and 61 into space 62 onto the filter pads 65. However, it is to be understood that the rate of this flow is controlled by metering openings 54.

The passage of the oil through pads 65 is relatively slow, hence the oil accumulates to a sufficient depth in space 62 for a part of the oil to flow through the small by-pass port 70 and join the main body of lubricant in well 39 through the space provided in cover 68. Thus, by observing through cover 68, this passage of oil from port 70, the sufficiency of the lubrication of bearing 25—26—28 may be judged.

It sometimes happens that a torque is exerted on pump shaft 13 by virtue of the water operating upon the pump runners. This torque may be in a direction reverse to the normal direction of operation of the water. It is desirable to prevent the pump shaft 13 from driving the motor shaft 2 in such reverse direction. To obviate this, a ratchet mechanism is provided.

For this purpose the upper coupling member 8 is provided with a plurality of radial arms 72, each of which carries a pawl pin 73. These pawl pins 73 are intended to co-operate with a series of ratchet teeth 74 disposed annularly below the pins 73 and supported as on a collar 75 threaded into the top of the support 29. The ratchet teeth 74, being stationary, will permit rotation of the coupling member 8 and, therefore, of the shaft structure, in but one direction. This is accomplished by the fact that the lower ends of the pawl pins 73 are urged upwardly along the slanting sides of the teeth for the permitted direction of rotation and in the vertical guiding apertures in the arms 72. A reverse rotation is prevented by the pins 72 abutting the abrupt shoulders of the teeth 74.

In order to prevent the pawl pins 73 from being entirely disengaged from the arms 72, a restraining disc 76 is provided, extending radially from coupling member 8 and above the pins 73. This restraining disc 76 limits the upward movement of the pins. It may be fastened as by the screws 77 to an appropriate shoulder formed on the coupling member 8.

The lower bearing structure for the shaft assembly is of the radial type. It includes a plurality of balls 78 and an inner race 79 carried by the lower extremity of the hollow shaft 2. The outer race 80 may be accommodated in a vertically extending cylindrical flange 81 integral with the bottom wall 82 of the base 23. Flange 81 serves to restrain the bearing structure 78—79—80 radially, but allows the structure to move freely in an axial direction to accommodate its position to that of the upper bearing structure 25—26—28.

In this case, also, a lubricant well 83 is provided having a draining aperture closed by a plug 84. The level 85 of the lubricant is shown in this instance also as being substantially at the top of the races 79 and 80, so that the bearing is submerged in the lubricant when the motor is not operating.

The top of the lubricant well is formed by a wall 86 having an upwardly inclined portion 87, carrying an upright cylindrical extension 88 adapted to telescope within a space 89 defined by the flange 90 of a guard member 91. This guard member 91 is carried by the shaft 2. By the interengagement of the elements 88 and 90, the vertical adjustment of the shaft structure is permitted, while at the same time the lubricant well is kept covered. In this way, in spite of the rotation of the rotor structure 1, the lubricant vapors are not carried off.

The member 91 has a flange-like extension 92 forming a chamber 93 above the balls 78. One or more radial apertures 94 in the flange 92 permits the passage of lubricant from the chamber 93 to the lubricant well 83. However, in order to make it possible to inspect the circulation of the oil during operation, or to determine the quantity of oil in the well at any time, a transparent cover member 95 similar to the cover member 68 is provided. This transparent cover member is shown as threaded into the internally threaded boss 96 of the base member 23. The wall for the lubricant well is provided with an opening 97 opposite the cover 95, and a radial passage 98 is provided in the top wall 86 of the lubricant well. This passage is in communication with the space above the bearing structure, its outer end opening opposite the cover 95. The lubricant flowing back into the well 83, after passing upwardly through bearing 78—79—80, must pass through the passage 98, down back of the cover 95, and through the opening 97. This circulation can be readily viewed through the cover 95.

An oil metering device 99, similar to that disclosed in connection with the upper bearing, may also be provided. Thus, the member 99 is shown as of disc form and extending beneath the bearing races 79 and 80. It may be fastened, as by screws 100, to the upper surface of the hub 101, which also serves to support the sleeve 102 defining the inner wall of the lubricant chamber 83. A screen 103 is shown extending below the metering member 99. This metering member, as before, may be provided with one or more metering apertures 104.

Axial adjustment of cylindrical race support 29 by means of nut 32 causes shaft 2, together with all connected parts, to move axially. Thus, rotor 1 is moved vertically with respect to the stator 19, the axial position of member 91 with respect to extension 88 is altered, and the bearing structure 78—79—80 moves axially in its guide flange 81. Also, shaft 13, which carries the pump runners, is correspondingly moved. It is, of course, possible to adjust the relative positions of shafts 2 and 13 by means of nut 14, and this serves to position the pump runners when the pump is not operating, as well as to alter the position of the runners with respect to the rotor. However, due to the various forces exerted while the pump is in operation, such adjustment of the pump runners is only approximate; but, by providing an adjustment means which may be manipulated while the pump is running, a more accurate adjustment of the position of the pump runners is possible, resulting in increased operating efficiency.

Provisions are made in the present instance to supply a lubricant to the pump shaft bearings extending below the electric motor. This is made effective only while the motor is in operation. For this purpose a solenoid operated valve structure 105 is provided. This valve structure is operated by a solenoid connected to the mains 106, in parallel with the motor mains, and controlled by the same switching mechanism. The structure 105 includes a hollow downwardly projecting threaded extension 107, engaging in a boss 108 formed in the bottom wall 109 of a recess formed in the lubricant top wall 86. The solenoid plunger 110 carries a valve closure 111 guided in extension 107, and co-operating with a valve seat 112. This valve seat 112 has a port 113 extending between the lubricant chamber 83 and a supply chamber 114. This supply chamber 114 is arranged to pass oil by gravity through the pipe and fittings 115 to the lower bearings, through a drip device 116. The valve seat 112 is shown in this instance as threaded into a wall 117 forming an extension of the lower wall of the lubricant well 83.

What is claimed is:

1. In a device of the character described, a vertical shaft, a bearing structure for the shaft, a closed frame for said structure, there being a lubricant well communicating with the bearing structure above and below it, said lubricant being passed upwardly through the structure and dropping back into the well, a filter device upon which said lubricant flows and disposed above the well, and a transparent cover for the frame for viewing the lubricant above and below said filter device.

2. In a device of the character described, a vertical shaft, a bearing structure for the shaft, a closed frame for said structure, there being a lubricant well communicating with the bearing structure above and below it, said lubricant being passed upwardly through the structure and dropping back into the well, means forming an open passageway from the top of the structure to the exterior wall of the frame, there being an opening from the well, and in the exterior of the frame, below said passageway, to pass the lubricant from the passageway back into the well, and a transparent cover for said wall passageway and opening, said open passageway being directed toward the cover to permit viewing of the flow of lubricant through said passageway.

3. In a support for a vertical shaft, a bearing structure having rolling elements and races therefor, means forming a lubricant well about said structure, means forming a stationary wall below said structure, said wall having one or more restricted apertures establishing communication between the well and the space between the races, the rotation of the bearing parts serving to pass lubricant upwardly through the space between the races, means forming a passage for returning to the well the lubricant which has passed upwardly through said space, and a transparent member through which the returning lubricant is visible.

4. In a support for a vertical shaft, a bearing structure having rolling elements and races therefor, means forming a lubricant well about said structure, means forming a stationary wall below said structure, said wall having one or more restricted apertures establishing communication between the well and the space between the races, the rotation of the bearing parts serving to pass lubricant upwardly through the space between the races, means forming a passage for returning to the well the lubricant which has passed upwardly through said space, said well forming means including a transparent member extending transversely of the liquid level so that said level is visible therethrough, and means to return at least a portion of the lubricant, which passes upwardly through the bearing, past said member to the well, including a passageway directed toward the member to permit viewing of the flow of lubricant.

5. In a support for a vertical shaft, a bearing structure having rolling elements and races therefor, means forming a lubricant well about said structure, means forming a stationary wall below said structure, said wall having one or more restricted apertures establishing communication between the well and the space below the races, the rotation of the bearing parts serving to pass lubricant upwardly through the space between the races, means forming a passage for returning to the well the lubricant which has passed upwardly through said space, and a transparent member through which the returning lubricant is visible, the capacity of said well being large with respect to the amount of lubricant passed through the bearing, whereby the lubricant level in the well is substantially constant regardless of rotation of the bearing.

6. In support for a vertical shaft, a bearing structure having rolling elements and races therefor, means forming a lubricant well about said structure, means forming a stationary wall below said structure, said wall having one or more restricted apertures establishing communication between the well and the space between the races, the rotation of the bearing parts serving to pass lubricant upwardly through the space between the races, means forming a passage for returning to the well the lubricant which has passed upwardly through said space, means forming a supplemental passage for returning part of the lubricant to the well, said supplemental passage terminating above the level of the lubricant in the well, and a transparent member through which the termination of the supplemental passage is visible.

7. In a support for a vertical shaft, a bearing structure having rolling elements and races therefor, means forming a lubricant well about said structure, means forming a stationary wall below said structure, said wall having one or more restricted apertures establishing communication between the well and the space between the races, the rotation of the bearing parts serving to pass lubricant upwardly through the space between the races, means forming a passage for returning to the well the lubricant which has passed upwardly through said space, said well forming means including a transparent member extending transversely of the liquid level so that said level is visible therethrough, and means forming a supplemental passage for returning part of the lubricant to the well, said supplemental passage having a termination above the level of the lubricant in the well and visible through the transparent member.

8. In a support for a vertical shaft, a bearing structure having rolling elements and races therefor, means forming a lubricant well about said structure, means forming a stationary wall below said structure, said wall having one or more restricted apertures establishing communication between the well and the space between the races, the rotation of the bearing parts serving to pass lubricant upwardly through the space between the races, means defining a space above the well, said means including a wall above the lubricant in the well, there being apertures, including filtering means, in said wall for passing lubricant from said space to the well, means for passing lubricant from said bearing into said space, means forming a by-pass port above said wall to permit lubricant to return to the well, and means for viewing said port.

9. In a support for a vertical shaft, a bearing structure having rolling elements and races therefor, means forming a lubricant well about said structure, means establishing restricted communication between said well and the space between said races, means passing lubricant from said well upwardly through said space, a transparent member in said well forming means extending transversely of the lubricant level in the well, as well as above and below said level, means forming a passage for returning to the well the lubricant which has passed upwardly through said space, and means causing at least a portion of said returning liquid to pass said transparent member, whereby the amount of lubricant in the well and the passage of lubricant through the bearing may be determined.

10. In a support for a vertical shaft, a bearing structure having rolling elements and races therefor, means forming a lubricant well about said structure, said structure being below the level of the lubricant in said well, means admitting a restricted quantity of lubricant from the well to the space between the races, the rotation of the bearing parts causing said lubricant to pass upwardly through said space, a transparent member in said well forming means extending transversely of the lubricant level in the well, as well as above and below said level, means forming a passage for returning to the well the lubricant which has passed upwardly through said space, and means causing at least a portion of said returning liquid to pass said transparent member, whereby the amount of lubricant in the well and the passage of lubricant through the bearing may be determined.

THOMAS G. MYERS.